LOW FREQUENCY MAGNETIC CORE STEPPING DEVICE
Filed Dec. 21, 1961
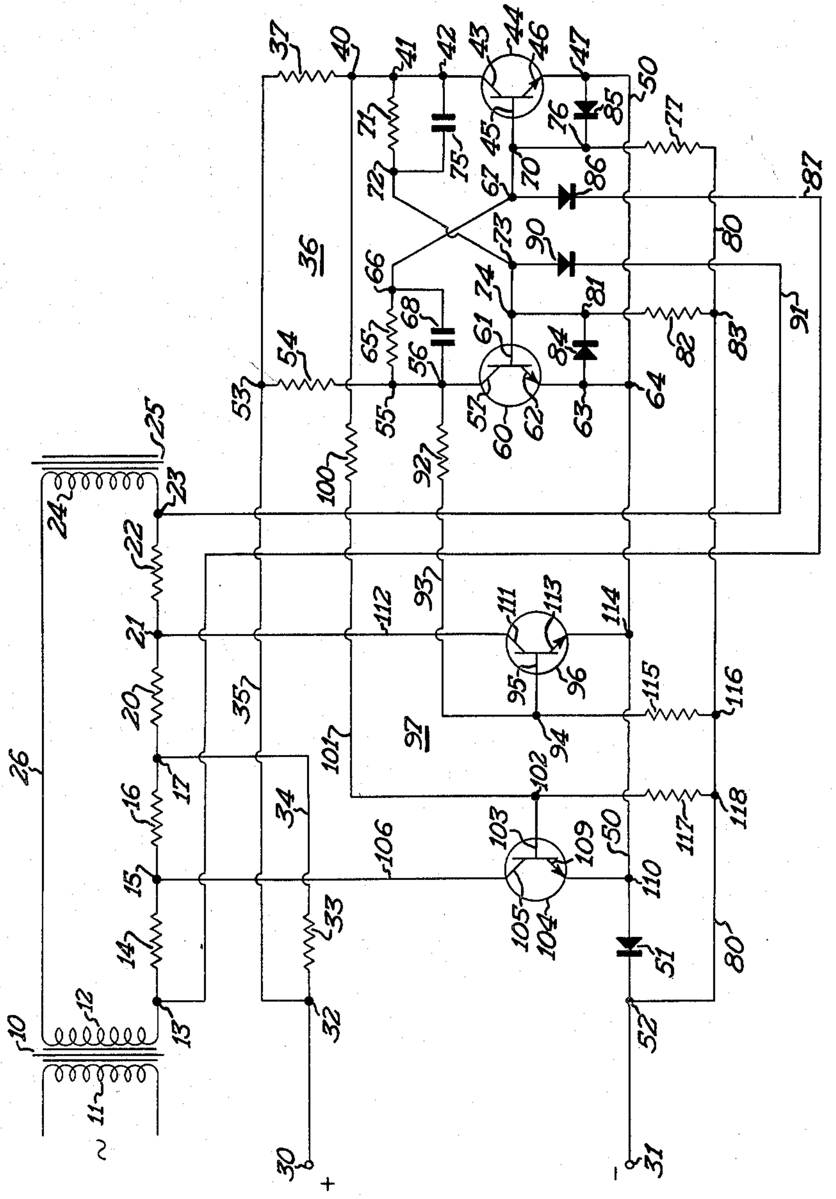
INVENTOR.
JAMES LEE JENSEN
BY
Omund R. Dahle
ATTORNEY

3,127,521
LOW FREQUENCY MAGNETIC CORE STEPPING DEVICE

James Lee Jensen, St. Louis Park, Minn., assignor to Minneapolis-Honeywell Regulator Company, Minneapolis, Minn., a corporation of Delaware Filed Dec. 21, 1961, Ser. No. 161,076
14 Claims. (Cl. 307—88)

This invention relates generally to a precision long interval oscillator or low frequency oscillator.

It is an object of this invention to provide an improved semiconductor-magnetic core oscillator having a low oscillating frequency.

It is another object of this invention to provide a low frequency semiconductor-magnetic core oscillator in which a very slightly unbalanced alternating current is applied to the magnetic core to produce a very long saturation time.

It is another object of this invention to provide a low frequency semiconductor-magnetic core oscillator utilizing a slightly unbalanced A.C. source to cause saturation of the core and core saturation sensing means for triggering a semiconductor switching circuit to reverse the sense of the A.C. unbalance each time core saturation is reached.

These and other objects of the invention will become more apparent upon a further consideration of the specification, claims and drawing of which:

The single figure of the drawing is a schematic representation of an embodiment of the invention.

Referring now to the drawing, a power transformer 10 has its primary 11 energized from a suitable regulated source of alternating current potential. The A.C. source may be of a conventional sinewave type or in certain circumstances it may be desirable to utilize a substantially squarewave A.C. source. A secondary winding 12 on the transformer 10 is designed to provide the desired voltage step-up or step-down, and has its lower terminal 13 connected through a resistor 14, a junction 15, a resistor 16, a junction 17, a resistor 20, a junction 21, and a resistor 22 to the lower terminal 23 of a winding 24 of a saturable timing core 25 which core is of a type having a substantially rectangular hysteresis loop. The upper terminals of windings 12 and 24 are directly connected together by a conductor 26. Saturable core 25 may be toroidal, if desired.

A pair of power input terminals 30 and 31 are connected to a suitable source of regulated direct current potential, not shown. The positive D.C. terminal 30 is connected by means of a junction 32, a resistor 33 and a conductor 34 to the junction 17. The terminal 30 is also connected by means of the junction 32 and a conductor 35 to provide the energization for a bistable flip-flop circuit generally shown at 36. More specifically, the conductor 35 is connected through a resistor 37 and a series of junctions 40, 41 and 42 to a collector electrode 43 of a semi-conductor current control means, here shown as an NPN type junction transistor 44. Although the circuit hereinatfer is described as utilizing semiconductor current control means of the NPN transistor type, the invention is not intended to be so limited. The transistor 44 also includes a base electrode 45 and an emitter electrode 46, the emitter electrode being connected by means of a junction 47, a conductor 50, a biasing diode 51 and a junction 52 to the negative D.C. input terminal 31.

The opposite current path in the bistable circuit 36 may be traced from a junction 53 on the conductor 35 through a resistor 54 and junctions 55 and 56 to a collector 57 of a transistor 60. A transistor 60 also includes a base electrode 61 and an emitter electrode 62, the emitter 62 being connected by way of a junction 63 to a junction 64 on the conductor 50. A feedback circuit be traced from the collector 57 of transistor 60 to the base 45 of transistor 44 from the junction 55 through a resistor 65, and junctions 66, 67 and 70 to the base 45. A capacitor 68 is connected between junctions 56 and 66 paralleling the resistor 65. In similar fashion, a feedback circuit is connected between the collector electrode 43 of transistor 44 and the base 61 of transistor 60. This circuit may be traced from junction 41 through a resistor 71 and junctions 72, 73 and 74 to the base electrode 61. A capacitor 75 is connected from junction 42 to junction 72 paralleling resistor 71.

A bias circuit from base 45 of transistor 44 may be traced from junction 70 through a junction 76, a resistor 77, and a conductor 80, to the junction 52 and thus to negative terminal 31. A similar circuit may be traced from base 61 through the junction 74, a junction 81, a resistor 82 and a junction 83 on the conductor 80 and thence through the conductor 80 to the negative terminal 31. A rectifying diode 84 for protecting transistor 60 from switching transients interconnects the junctions 63 and 81 with the direction of easy current flow being towards junction 81, and likewise a diode 85 interconnects the junctions 47 and 76 with the direction of easy current flow being towards junction 76 to protect transistor 44 from switching transients.

A signal input circuit may be traced from the junction 67 through a rectifying diode 86 and a conductor 87 to the junction 13. Another signal input circuit may be traced from the junction 73 through a rectifying diode 90 and a conductor 91 to the junction 23.

An output circuit exists from bistable circuit 36, which output circuit may be traced from the junction 56 through a resistor 92, a conductor 93 and a junction 94 to a base electrode 95 of an NPN transistor 96 which forms a part of a switching circuit generally designated as 97. Another output from the bistable circuit 36 may be traced from the junction 40 through a resistor 100, a conductor 101 and a junction 102 to a base electrode 103 of an NPN transistor 104. The transistor 104 also includes a collector electrode 105 which is directly connected by a conductor 106 to the junction 15, and also includes an emitter electrode 107 which is directly connected to a junction 110 on the conductor 50. The transistor 96 also includes a collector 111 which is directly connected by a conductor 112 to the junction 21, and also includes an emitter 113 which is directly connected to a junction 114 on the conductor 50. The base electrode 95 of transistor 96 is connected by means of the junction 94 and a resistor 115 to a junction 116 on the conductor 80 and likewise the base electrode 103 is connected by way of the junction 102 and a resistor 117 to a junction 118 on the conductor 80.

In considering the principle of operation of the low frequency oscillator it is known that when a D.C. voltage is applied to a winding on a magnetic core, a magnetic flux begins to build up within the core. The rate of this flux buildup is dependent upon the applied voltage and the number of turns in the winding on the core. The direction of flux buildup is dependent upon the polarity of the applied voltage. A specific volt-second time integral is required to drive a toroidal core of rectangular hysteresis loop material from one state of saturation to the opposite state, and since the number of transformer turns and the total flux capacity of the apparatus are fixed only the applied voltage has to be held constant to generate a specific time interval.

The development of long time intervals with small core sizes requires the application of very low voltages. Since this applied D.C. voltage is substantially smaller than that required to drive the magnetizing current through the coil and also to overcome the coil resistance, the necessary drive is provided by superimposing an A.C. voltage on the low level D.C. voltage. In this way the magnetizing current is supplied by the A.C. source. The A.C. potential is sufficiently large to change the core flux in a minor hysteresis loop but is much smaller than would be required to drive the core to saturation. The continually reversing A.C. voltage produces a zero net change in the core flux; however, the low level D.C. voltage adds to one half cycle of the A.C. voltage and subtracts from the other half cycle thereby resulting in a slight unbalance, and causing the core to be slowly driven towards one state of saturation in a series of minor hysteresis loops. When saturation of the timing core is reached, the back electromotive force generated within the core is diminished and the resulting increase in current flow therethrough is utilized to trigger a bistable or flip-flop circuit to reverse the polarity of the applied D.C. voltage whereupon the core is slowly driven towards the opposite state of saturation to complete one cycle of operation.

Referring now more specifically to the drawing, the bistable circuit 36 controls the switching circuit 97 to determine which of transistors 96 and 104 will be conductive. The switching circuit 97, in turn controls the polarity of the D.C. potential to be applied to timing core 25. For purposes of explanation, assume that in the bistable circuit 36 the transistor 60 is conductive and transistor 44 is cut off. Under these conditions conducting transistor 60 is in effect, a short circuit or closed switch, and transistor 44 acts as a very high impedance or open switch. The potential at the output terminal 56 will therefore approach that of negative source 31; and the potential at the output terminal 40 will be highly positive with respect to the voltage at terminal 56, approaching the potential of positive source terminal 30. The positive voltage at output terminal 40 connected through resistor 100 to base electrode 103 will render transistor 104 highly conductive while transistor 96 will be biased to cut off.

During the period that transistor 104 is maintained highly conductive, a current path may be traced from positive source terminal 30 through the relatively large resistance 33 to junction 17, to the left through the relatively small resistance 16 to the junction 15, through conductor 106, transistor 104 from collector to emitter, and through biasing diode 51 to the negative terminal 31. The relative values of resistors 33 and 16 are chosen so that a very small D.C. voltage appears across resistor 16 with junction 17 being positive with respect to junction 15. The voltage magnitude on resistor 16 is constant and may be in the order of millivolts. Due to the voltage across resistor 16 a secondary current is caused to flow in the circuit parallel to resistor 16 which comprises resistors 20 and 22, winding 24, conductor 26, winding 12 and resistor 14. This direct current flowing through winding 24, as is mentioned above, is small compared with that required and the core magnetization is not substantially changed. The alternating current voltage on winding 12, however, is superimposed on the D.C. and is sufficiently large to cause flux change in the magnetic core 25.

The combination of A.C. and D.C. causes a slight unbalance or asymmetry of the voltage applied to the core on opposite half cycles. The flux change in the core with asymmetric or offset half cycles results in a flux change which slowly moves up the major hysteresis loop in a series of minor loops. The resistors 14, 16, 20 and 22 are designed such that the current flowing therethrough and the voltage thereacross, when core 25 is not saturated, is not sufficient to overcome the threshold of diodes 90 and 86 and no switching signals are applied to the bistable circuit 36. It can be seen, therefore, that the A.C. voltage should be large enough to produce an appreciable signal when saturation is reached but should be much less than that required to cause a major flux excursion on the full hysteresis loop.

When the timing toroid 25 reaches positive saturation, the increase in magnetizing current to timing core 24 also flows through the resistors 14, 16, 20 and 22 causing an increased and sufficiently negative voltage to appear at junction 23 such that a signal pulse will be applied through diode 90 to the base 61 of transistor 60 to turn off transistor 60. The bistable flip-flop circuit 36 is now reversed in the conventional manner and transistor 44 conducts while transistor 60 remains cut off. One half cycle of operation of the oscillator has now been completed and the second half cycle begins.

Considering now the operation with transistor 44 conductive and transistor 60 cut off it is readily recognizable that the polarities at output terminals 56 and 40 reverse, so that terminal 56 becomes positive with respect to terminal 40. Transistor 96 is therefore biased to conduction and transistor 104 biased to cut off.

During this second half cycle of oscillation in which transistor 96 is conductive a current path may be traced from positive source terminal 30 through the relatively large resistance 33 to junction 17, then to the right through the relatively small resistance 20 to junction 21, through conductor 112, transistor 96 and through biasing diode 51 to negative terminal 31. For balanced timing half cycles the resistance 20 is of equal value with the resistance 16 so that the very small D.C. voltage appearing across resistance 20 is of the same magnitude, but of opposite polarity, with that above discussed across resistance 16 during the first half cycle. Resistance 20 may be of a different value if it is desired to have unequal half cycles. The combination of the A.C. from winding 12 and the D.C. causes a slight unbalance of asymmetry of the voltage applied to core 25 in the opposite sense as during the first half cycle of oscillation and the resultant flux change in the core slowly moves down the major hysteresis loop in a series of minor loops. Upon negative saturation being reached in core 25 a slight increase in current through winding 24 and resistors 14, 16, 20 and 22 causes a sufficiently negative voltage at junction 13 such that a signal pulse will be applied through diode 86 to the base 45 of transistor 44 to again switch the bistable circuit 36.

By way of illustration and example, and not by way of limitation the following list of components has been used in one successful embodiment as shown in the drawing and provides a highly practical oscillator circuit.

| | |
|---|---|
| Transistors 44, 60, 96, 104 | 2N337. |
| Capacitor 68, 75 | 150 pfd. |
| Resistor 37, 54 | 1000 ohm. |
| Resistor 65, 75 | 8200 ohm. |
| Resistor 77, 82 | 3900 ohm. |
| Resistor 92, 100 | 10K ohm. |
| Resistor 115, 117 | 4700 ohm. |
| Resistor 16, 20 | 47 ohm. |
| Resistor 14, 22 | 1800 ohm. |
| Resistor 33 | 2700 ohm. |
| Bias diode 51 | Silicon diode. |

In summary of operation of the precision low frequency oscillator, the principle used is that of applying a very slightly unbalanced alternating current to a magnetic core in order to produce an exceptionally long saturation time. The saturation of the magnetic core serves to time the period of oscillation and provides a signal to a bistable circuit to reverse the polarity of the direct current unbalance to the timing core. Neither the D.C. unbalance or the A.C. is, by itself, capable of saturating the timing core, therefore numerous traverses of the toroid hysteresis loop are required, and since the A.C. fed to the timing core is unbalanced or offset by the D.C. voltage across resistor 16 or 20, each traverse of the B—H curve moves a step closer to the core saturation point. D.C. polarity reversal occurs every time the timing core is saturated and serves to initiate the traversions of the hysteresis loop (that is, the series of minor loops) toward the opposite saturation point. Since this reversal is automatic and occurs every time the core saturates, the device operates as a very low frequency oscillator with traverse of the complete hysteresis loop for each half cycle.

In the embodiment disclosed, the switching transistors 96 and 104 operate as inverse followers of transistors 60 and 44, and it may be desirable under certain conditions to combine the functions of 96 and 60, and of 104 and 44 to reduce the number of circuit components.

In the specific embodiment described the alternating current source and direct current source are both connected to winding 24. It may be desirable under some conditions to isolate the A.C. and the D.C. and to apply each to a separate winding of timing core 25 rather than to a single winding.

Many changes and modifications of this invention will undoubtedly occur to those who are skilled in the art and I therefore wish it to be understod that I intend to be limited by the scope of the appended claims and not by the specific embodiment of my invention which is disclosed herein for the purpose of illustration only.

I claim:

1. Low frequency oscillator apparatus comprising: input circuit means having input terminals energized from a source of alternating current; saturable magnetic core means, said means including winding means; means comprising impedance means connecting said winding means to said input circuit means; a source of direct current potential; switching circuit means having control and switching terminals, said switching terminals connecting said direct current potential in polarity reversable direction to said impedance means for energizing said core means from said alternating current and said direct current to drive said core slowly to saturation; and core saturation responsive control means connected to said switching means control terminals for actuating said switching means to reverse said polarity direction of said direct current potential upon saturation of said core means.

2. Low frequency oscillator apparatus comprising: input circuit means having input terminals energized from a source of alternating current; saturable magnetic core means, said means including winding means; impedance means; connection means connecting in a series circuit said winding means, said impedance means and said input circuit means; a source of direct current potential; switching circuit means having control and switching terminals, said switching terminals connecting said direct current potential in polarity reversable direction to said impedance means for energizing said core means from both said alternating current and said direct current to drive said core slowly to saturation in a series of minor hysteresis loops; and core saturation responsive control means connected to said switching means control terminals for actuating said switching means to reverse said polarity direction of said direct current potential upon saturation of said core means.

3. Low frequency oscillator apparatus comprising: input circuit means having input terminals energized from a source of alternating current; volt-second integrating means comprising saturable magnetic core means having a substantially rectangular hysteresis loop and winding means coupled to said core means; impedance means; connection means connecting in a series circuit said winding means, said impedance means and said input circuit means; a source of direct current potential; switching circuit means having control and switching terminals, said switching terminals connecting said direct current potential in polarity reversable direction to said impedance means for energizing said volt-second integrating means from both said alternating current and said direct current to drive said core slowly to saturation in a series of minor hysteresis loops; and core saturation responsive control means connected to said switching means control terminals for actuating said switching means to reverse said polarity direction of said direct current potential upon saturation of said core means.

4. Low frequency oscillator apparatus comprising: saturable magnetic core means; a source of alternating current potential; a source of direct current potential; circuit means connecting said sources in energizing relation to said saturable core means; polarity reversing switching means having a control circuit and having switching terminals connected to reverse the polarity of said source of direct current potential upon a signal being applied to said control circuit; means connected to sense the effect of the saturation of said magnetic core means and provide an output signal in response thereto; and means connecting said output signal to said switching means control circuit for causing a reversal of the polarity of said direct current source upon each occurrence of saturation of said core means.

5. Low frequency oscillator apparatus comprising: saturable magnetic core means; a source of alternating current potential of sufficient amplitude to accomplish a change in flux of said magnetic core means but of insufficient magnitude to saturate said magnetic core means; a source of direct current potential of small magnitude compared to said alternating current potential; circuit means superimposing said alternating current source and said direct current source in energizing relation to said saturable core means; polarity reversing switching means have a control circuit and having switching terminals connected to reverse the polarity of said source of direct current potential upon a signal being applied to said control circuit; means connected to sense the effect of saturation of said magnetic core means and provide an output signal in response thereto; and means connecting said output signal to said switching means control circuit for causing a reversal of the polarity of said direct current source upon each occurrence of saturation of said core means.

6. Low frequency oscillator apparatus comprising: saturable magnetic core means; a source of alternating current potential of sufficient amplitude to accomplish a change in flux of said magnetic core means but of insufficient magnitude to saturate said magnetic core means; a source of direct current potential of small magnitude compared to said alternating current potential; circuit means connecting said sources in energizing relation to said saturable core means thereby in effect applying to said magnetic core means an unbalanced alternating current; polarity reversing switching means having a control circuit and having switching terminals connected to reverse the polarity of said source of direct current potential upon a signal being applied to said control circuit; means connected to sense the effect of saturation of said magnetic core means and provide an output signal in response thereto; and means connecting said output signal to said switching means control circuit for causing a reversal of the polarity of said direct current source upon each occurrence of saturation of said core means so that the sense of unbalance of said alternating current is thereby reversed.

7. Low frequency oscillator apparatus comprising: saturable magnetic core means; a source of alternating current potential; a source of direct current potential; circuit means connecting said sources in energizing relation to said saturable core means; polarity reversing semiconductor switching means having control and switching electrodes, said switching electrodes being connected to reverse the polarity of said source of direct current potential upon a signal being applied to said control electrodes; means connected to sense the effect of saturation of said magnetic core means and provide an output signal in response thereto; and means connecting said output signal to said semiconductor switching means control electrodes for causing a reversal of the polarity of said direct current source upon each occurrence of saturation of said core means.

8. Low frequency oscillator apparatus comprising: saturable magnetic core means; a source of alternating current potential; a source of direct current potential; first circuit means including impedance means connecting said sources in energizing relation to said saturable core means; polarity reversing semiconductor bistable circuit means having control and switching electrodes, said switching electrodes being connected to reverse the polarity of said source of direct current potential to said first circuit means upon a signal being applied to said control electrodes; means connected to sense the effect of the saturation of said magnetic core means and provide an output signal in response thereto; and means connecting said output signal to said semiconductor bistable circuit means control electrodes for causing a reversal of the polarity of said direct current source upon each occurrence of saturation of said core means.

9. Low frequency oscillator apparatus comprising: saturable magnetic core means including winding means coupled thereto; a source of alternating current potential; a source of direct current potential; first circuit means including resistive means connecting said sources in energizing relation to said winding means; polarity reversing semiconductor flip-flop circuit means having control and switching electrodes, said switching electrodes being connected to effect the reversal of polarity of said source of direct current potential to said first circuit means upon a signal being applied to said control electrodes; means including said resistive means connected to sense the effect of the saturation of said magnetic core means and provide an output signal in response thereto; and means connecting said output signal to said semiconductor flip-flop means control electrodes for causing a reversal of the polarity of said direct current source to said winding means upon each occurrence of saturation of said core means.

10. Low frequency oscillator apparatus comprising: saturable magnetic core means; a source of alternating current potential; a source of direct current potential; circuit means connecting said sources in energizing relation to said saturable core means, the energizing effect on said saturable core means being that of an offset alternating current; polarity reversing semiconductor switching means having control and switching electrodes, said switching electrodes being connected to reverse the polarity of said source of direct current potential upon a signal being applied to said control electrodes so that the sense of said offset of said alternating current is thereby reversed; means connected to sense the effect of saturation of said magnetic core means and provide an output signal in response thereto; and means connecting said output signal to said semiconductor switching means control electrodes for causing a reversal of the polarity of said direct current source upon each occurrence of saturation of said core means.

11. Low frequency oscillator apparatus comprising: saturable magnetic core means; a source of alternating current potential; a source of direct current potential; first circuit means connecting said alternating current source in energizing relation to said saturable core means; second circuit means connecting said direct current source in energizing relation to said saturable core means; polarity reversing semiconductor switching means having control and switching electrodes, said switching electrodes being connected to reverse the polarity of said source of direct current potential upon a signal being applied to said control electrodes; means connected to sense the effect of saturation of said magnetic core means and provide an output signal in response thereto; and means connecting said output signal to said semiconductor switching means control electrodes for causing a reversal of the polarity of said direct current source upon each occurrence of saturation of said core means.

12. Low frequency oscillator apparatus comprising: saturable magnetic core means; a source of alternating current potential of sufficient amplitude to accomplish a change in flux of said magnetic core means but of insufficient magnitude to saturate said magnetic core means; a source of direct current potential of small magnitude compared to said alternating current potential; first circuit means connecting said alternating current source in energizing relation to said saturable core means; second circuit means connecting said direct current source in energizing relation to said saturable core means; polarity reversing switching means having a control circuit and having switching terminals connected to reverse the polarity of said source of direct current potential upon a signal being applied to said control circuit; means connected to sense the effect of saturation of said magnetic core means and provide an output signal in response thereto; and means connecting said output signal to said switching means control circuit for causing a reversal of the polarity of said direct current source upon each occurrence of saturation of said core means.

13. Low frequency oscillator apparatus comprising: saturable magnetic core means; a source of alternating current potential of sufficient amplitude to accomplish a change in flux of said magnetic core means but of insufficient magnitude to saturate said magnetic core means; first circuit means including impedance means connecting said alternating current source in energizing relation to said saturable core means; a source of direct current potential of small magnitude compared to said alternating current potential; polarity reversing switching means having a control circuit and having switching terminals connected to reverse the polarity of said source of direct current potential upon a signal being applied to said control circuit; second circuit means comprising said switching means connecting said direct current source in energizing relation to said saturable core means; means including said impedance means connected to sense the effect of saturation of said magnetic core means and provide an output signal in response thereto; and means connecting said output signal to said switching means control circuit for causing a reversal of the polarity of said direct current source upon each occurrence of saturation of said core means.

14. Low frequency oscillator apparatus comprising: saturable magnetic core means including winding means coupled thereto; a source of alternating current potential of sufficient amplitude to accomplish a change in flux of said magnetic core means but of insufficient magnitude to saturate said magnetic core means; first circuit means including impedance means connecting said alternating current source in energizing relation to said winding means; a source of direct current potential of small magnitude compared to said alternating current potential; polarity reversing semiconductor switching means comprising a pair of semiconductor devices connected in flip-flop relation, said devices having control and switching electrodes connected to reverse the polarity of said direct current potential to said saturable core means upon a signal being applied to said control circuit; second circuit means comprising said semiconductor switching means connecting said direct current source in energizing relation to said winding means; means including said impedance means connected to sense the effect of saturation of said magnetic core means and provide an output signal in response thereto; and means connecting said output signal to said switching means control circuit for causing a reversal of the polarity of said direct current source upon each occurrence of saturation of said core means.

No references cited.